(12) United States Patent
Sawlani et al.

(10) Patent No.: US 12,530,021 B2
(45) Date of Patent: Jan. 20, 2026

(54) PERFORMANCE PREDICTORS FOR SEMICONDUCTOR-MANUFACTURING PROCESSES

(71) Applicant: Lam Research Corporation, Fremont, CA (US)

(72) Inventors: Kapil Umesh Sawlani, Sunnyvale, CA (US); Michal Danek, Cupertino, CA (US); Ravi Vellanki, San Jose, CA (US); Sanjay Gopinath, Fremont, CA (US); David G. Cohen, San Jose, CA (US); Sassan Roham, San Ramon, CA (US); Saravanapriyan Sriraman, Fremont, CA (US); Benjamin Allen Haskell, Pleasanton, CA (US); Lee J. Brogan, Newberg, OR (US)

(73) Assignee: Lam Research Corporation, Fremont, CA (US)

( * ) Notice: Subject to any disclaimer, the term of this patent is extended or adjusted under 35 U.S.C. 154(b) by 452 days.

(21) Appl. No.: 17/795,518

(22) PCT Filed: Jan. 26, 2021

(86) PCT No.: PCT/US2021/015121
§ 371 (c)(1),
(2) Date: Jul. 26, 2022

(87) PCT Pub. No.: WO2021/154747
PCT Pub. Date: Aug. 5, 2021

(65) Prior Publication Data
US 2023/0049157 A1 Feb. 16, 2023

Related U.S. Application Data

(60) Provisional application No. 62/966,378, filed on Jan. 27, 2020.

(51) Int. Cl.
*G05B 19/418* (2006.01)
*G05B 13/02* (2006.01)

(52) U.S. Cl.
CPC .... *G05B 19/41885* (2013.01); *G05B 13/0265* (2013.01); *G05B 2219/32338* (2013.01);
(Continued)

(58) Field of Classification Search
CPC .................. G05B 19/41885; G05B 13/0265
(Continued)

(56) References Cited

U.S. PATENT DOCUMENTS

2004/0229386 A1\* 11/2004 Golovchenko .. G01N 33/48721
438/10
2005/0071034 A1\* 3/2005 Mitrovic ................ G06F 30/20
700/121

(Continued)

FOREIGN PATENT DOCUMENTS

CN 115023798 9/2022
JP H0637021 2/1994
(Continued)

OTHER PUBLICATIONS

International Application Serial No. PCT/US2021/015121, International Search Report mailed May 21, 2021, 3 pgs.
(Continued)

*Primary Examiner* — Jigneshkumar C Patel
(74) *Attorney, Agent, or Firm* — Schwegman Lundberg & Woessner, P.A.

(57) ABSTRACT

Methods, systems, and computer programs are presented for predicting the performance of semiconductor manufacturing equipment operations. One method includes an operation for obtaining machine-learning (ML) models, each model related to predicting a performance metric for an operation of a semiconductor manufacturing tool. Further, each ML
(Continued)

model utilizes features defining inputs for the ML model. The method further includes an operation for receiving a process definition for manufacturing a product with the semiconductor manufacturing tool. One or more ML models are utilized to estimate a performance of the process definition used in the semiconductor manufacturing tool. Additionally, the method includes presenting, on a display, results showing the estimate of the performance of the manufacturing of the product. In some aspects, the use of hybrid models improves the predictive accuracy of the system by augmenting the capabilities of data-driven models with the reinforcement provided by the physics-based models.

20 Claims, 14 Drawing Sheets

(52) U.S. Cl.
CPC .............. *G05B 2219/33034* (2013.01); *G05B 2219/45031* (2013.01)

(58) Field of Classification Search
USPC ......................................................... 700/121
See application file for complete search history.

(56) References Cited

U.S. PATENT DOCUMENTS

| | | | |
|---|---|---|---|
| 2005/0071038 A1* | 3/2005 | Strang | G06F 30/23 700/121 |
| 2012/0016643 A1 | 1/2012 | Jang et al. | |
| 2013/0204418 A1* | 8/2013 | Chang | G05B 19/41875 700/110 |
| 2014/0031969 A1* | 1/2014 | Baseman | G05B 13/048 700/121 |
| 2014/0135970 A1* | 5/2014 | Kaushal | G05B 19/41875 700/121 |
| 2015/0058813 A1 | 2/2015 | Kim et al. | |
| 2015/0332167 A1* | 11/2015 | Kaushal | G05B 19/418 706/12 |
| 2018/0082826 A1 | 3/2018 | Guha et al. | |
| 2018/0275523 A1* | 9/2018 | Biafore | G01N 21/8851 |
| 2018/0356807 A1 | 12/2018 | Honda et al. | |

FOREIGN PATENT DOCUMENTS

| | | |
|---|---|---|
| JP | 2019537240 A | 12/2019 |
| JP | 2023511122 | 3/2023 |
| JP | 7636418 | 2/2025 |
| KR | 20160047511 A | 5/2016 |
| WO | WO-2018204410 A1 | 11/2018 |

OTHER PUBLICATIONS

International Application Serial No. PCT/US2021/015121, Written Opinion mailed May 21, 2021, 3 pgs.

"International Application Serial No. PCT US2021 015121, International Preliminary Report on Patentability mailed Aug. 11, 2022", 5 pgs.

"Korean Application Serial No. 10-2022-7028664, Voluntary Amendment filed Jan. 25, 2024", 7 pgs.

Japanese Application Serial No. 2022-544044, Notification of Reasons for Refusal mailed Sep. 3, 2024, w/ English Translation, 11 pgs.

Japanese Application Serial No. 2022-544044, Response filed Dec. 3, 2024 to Notification of Reasons for Refusal mailed Sep. 3, 2024, w/ English translation, 11 pgs.

"Korean Application Serial No. 10-2022-7028664, Notice of Preliminary Rejection mailed Sep. 26, 2025", w English Translation, 18 pgs.

* cited by examiner

FEATURE MODELING AT MULTIPLE LEVELS

| LEVEL | ETCH/ATOMIC LAYER ETCH | ELECTROFILL | (PE)CVD/ALD | CLEAN/STRIP | PHYSICAL VAPOR DEPOSITION | CHEMICAL/MECHANICAL POLISHING |
|---|---|---|---|---|---|---|
| CHAMBER | GEOMETRY, FLOW, THERMAL, STRUCTURAL, ELECTRO-MAGNETICS | GEOMETRY, FLOW, THERMAL, STRUCTURAL, ELECTRO-MAGNETICS | GEOMETRY, FLOW, PURGING, THERMAL, STRUCTURAL, ELECTRMGN. | GEOMETRY, FLOW, THERMAL, STRUCTURAL | GEOM, FLOW, THERMAL, STRUCTURAL, ELECTRO-MAGNETICS | GEOMETRY, FLOW, THERMAL, STRUCTURL |
| PROCES-SING MATRIX | PLASMA, FIELDS, CHEMISTRY, REACTIONS | MASS TRNSPT., ELECTRIC FIELDS, SOLUTION REACTIONS | PLASMA, MASS TRANSPORT, REACTIONS | MASS TRANSPORT, SOLUTION REACTIONS | PLASMA, FIELDS, CHEMISTRY, REACTIONS | MASS TRNSPT, SOLUTION REACTIONS |
| SUBSTRATE-LEVEL | RF VOLTAGE, COLLISIONS, PATHWAYS | TERMINAL EFFECT, RPM, BIAS EFFECTS | COLLISIONS, PATHWAYS | SOLVENT DYNAMICS, SPRAY UNIFORMITY | RF VOLTAGE, COLLISIONS, PATHWAYS | SOLVENT DYNAMICS, ABRASION EFFECTS |
| FEATURES | LAYOUT, CHEMISTRY | CHEMISTRY, PATTERN LOADING, GEOM EFFECTS | LAYOUT, CHEMISTRY | LAYOUT, PATTERN COLLAPSE, CHEMISTRY | LAYOUT, CHEMISTRY | LAYOUT, CHEMISTRY |
| ATOMISTIC | DYNAMICS | DYNAMICS | DYNAMICS | SURFACE MODIFICATION | DYNAMICS | SURFACE MODIFICATN. |
| ELECTRNC STATE | STATICS FOR ENERGY CALCULATION | OXIDATION EFFECTS | STATICS FOR ENERGY CALCULATION | OXIDATION EFFECTS | STATICS FOR ENERGY CALCULATION | OXIDATION EFFECTS |

412

EXAMPLES OF MODELING ALGORITHMS

FIG. 4B

FEATURES (1)

| SCALE | PHENOMENA | INPUTS | OUTPUTS |
|---|---|---|---|
| CHAMBER | GEOMETRY | DESIGN DIMENSIONS | GEOMETRY (E.G., CAD FILE, MESH) |
| | FLOW | FLOW RATES, PRESSURE, CHEMISTRY, FLOW TRANSIENTS | PRESSURE AND VELOCITY FIELDS, SPECIES CONCENTRATION, ADVECTION AND DIFFUSION FLUXES |
| | THERMAL | HEAT FLUXES, HEAT TRANSFER COEFFICIENTS, THERMAL CONDUCTIVITIES, HEAT CAPACITY, AREA OF CONTACT | TEMPERATURE, HEAT FLUXES (RADIATION, CONDUCTION, AND CONVECTION), AND LOSSES |
| | STRUCTURAL | LOADS, REACTIONS, TOLERANCES, TEMPERATURE, GRADIENT, PRESSURE | STRESS, STRAIN, DEFLECTION, CREEP RATE, FATIGUE, ELASTICITY/PLASTICITY |
| | ELECTROMAG-NETICS | VOLTAGE, CURRENT, FREQUENCY, INDUCTANCE, CAPACITANCE, IMPEDANCE | E FIELD, B FIELD, INDUCED CURRENT DENSITY, POWER DENSITY |
| PLASMA | PLASMA BEHAVIOR | E FIELD, B FIELD, CURRENT DENSITY, CHEMISTRY, REACTION CROSS SECTION, REACTION PATHWAYS, MATERIAL PROPERTIES (CONDUCTIVITY, PERMITTIVITY, EMISSION COEFF), FREQUENCY, VOLTAGE, RF BIAS | CHARGED SPECIES DENSITY AND FLUXES, AMBIPOLAR FIELD, ELECTRON TEMPERATURES, EEDF, IEAD, ON-WAFER FLUXES, CHARGE DENSITY (SURFACE AND VOL) SOURCE AND LOSS TERMS FOR SPECIES |

FIG. 9

FEATURES (2)

| SCALE | PHENOMENA | INPUTS | OUTPUTS |
|---|---|---|---|
| SHEATH | SHEATH PERFORMANCE | RF VOLTAGE, E-FIELDS, SOURCE TERMS, REACTION COLLISION CROSS SECTIONS, REACTION PATHWAYS | FLUXES ON SURFACE, ION ENERGY AND ANGULAR DISTRIBUTION, CONDUCTION AND DISPLACEMENT CURRENTS, ION TRANSIT TIMES, CHARGE DENSITY |
| FEATURE | LAYOUT | DESIGN LAYOUT OF APPLICATION, MASK LAYERS, INITIAL SHAPES | USABLE FORM VIA CAD OR MESH |
|  | CHEMISTRY | ON-WAFER FLUXES, MATERIAL PROPERTIES, REACTION PATHWAYS, REACTION RATES, ION ANGULAR YIELDS, ETCH THRESHOLDS, STICKING COEFFICIENTS, ACCOMMODATION COEFFICIENT | GEOMETRY EVOLUTION AND FRONT TRACKING, DISTRIBUTION OF SPECIES INSIDE FEATURE, DISTRIBUTION OF ION ENERGIES AND ANGLES INSIDE FEATURES |
| ATOMISTIC | DYNAMICS | LATTICE STRUCTURE, MATERIAL ID, INTERATOMIC POTENTIAL | LATTICE LAYOUT, SPECIES DISTRIBUTION, RADIAL DISTRIBUTION FUNCTION, DIFFUSION COEFFICIENTS, ETC., REACTION KINETICS |
| ELECTRONIC STATES | STATICS FOR ENERGY CALCULATION | MATERIAL/SPECIES ID, CLUSTER CONFIGURATION, ELECTRONIC STRUCTURE INFORMATION | ENERGY STATES, CLUSTER CONFIGURATION, REACTION ENERGETICS, REACTION PATHWAYS, BOND ANGLES, BOND LENGTHS |

FIG. 10

PERFORMANCE PREDICTORS FOR SEMICONDUCTOR-MANUFACTURING PROCESSES

CLAIM OF PRIORITY

This application is a U.S. National Stage Filing under 35 U.S.C. 371 from International Application No. PCT/US2021/015121, filed on Jan. 26, 2021, and published as WO 2021/154747 A1 on Aug. 5, 2021, which claims the benefit of priority to U.S. Patent Application Ser. No. 62/966,378, filed on Jan. 27, 2020, each of which is incorporated by reference herein in its entirety.

TECHNICAL FIELD

The subject matter disclosed herein generally relates to methods, systems, and machine-readable storage media for predicting the performance of deposition, etch, and clean processes in a semiconductor manufacturing tool.

BACKGROUND

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Great effort is typically invested in high-fidelity modeling and simulation of semiconductor process reactors and device features to better understand physical and chemical mechanisms between the species (e.g., in gas phase, aqueous or organic solvated phases, solid state) phase and associated surface kinetics on a substrate. A good understanding and predictability of such systems is very important for improving product design as well as optimizing the process conditions, e.g., tuning the semiconductor manufacturing tool parameters.

SUMMARY

Example methods, systems, and computer programs are directed to predicting the performance of semiconductor manufacturing equipment operations. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Hybrids of physics-based and data-driven models, also known as hybrid models, provide an opportunity to construct relationships between various factors (generated in experiments or simulation datasets) and response variables that may not be directly coupled or have non-linear dependencies. As different models (high-fidelity simulations, data-driven models, reduced-order models, etc.) are used to construct these relationships, the effective hybrid model can identify relationships not previously known. These hybrid models are cheaper to compute than high-fidelity physics-based simulations and can span a large range of spatial and temporal scales. As hybrid models are augmented with experimental data, the predictive value of the results improves as uncertainties and assumptions that cause the simulation to vary from experimental data are eliminated or their effects decreased. This approach aims to reduce the time spent between design, fabrication, and testing phases of a project, resulting in faster solutions and reduction in the cost of products.

Embodiments presented utilize the varying disconnected datasets generated from physics-based simulations (e.g., high-fidelity CFD simulations, atomistic simulations), approximate methods (e.g., reduced-order models, approximate models), experimental data, and other data sources (either as individual models or stacked models) to determine the collective impact on processing semiconductor features. The data obtained from these sources may be analyzed using machine-learning (ML) techniques to better predict process behaviors and expected results. The ML techniques include any combination of statistical modeling, deep neural networks, recurrent neural networks, convolutional neural networks, kriging, dynamic mode decomposition proper orthogonal decomposition, etc., to generate a physics-constrained data-driven model.

One method includes an operation for obtaining machine-learning (ML) models, each model related to predicting a performance metric for an operation of a semiconductor manufacturing tool. Further, each ML model utilizes features defining inputs for the ML model. The method further includes an operation for receiving a process definition for manufacturing a product with the semiconductor manufacturing tool. One or more ML models are utilized to estimate a performance of the process definition used in the semiconductor manufacturing tool. Additionally, the method includes presenting, on a display, results showing the estimate of the performance of the manufacturing of the product.

Another general aspect is for a system that includes a memory comprising instructions and one or more computer processors. The instructions, when executed by the one or more computer processors, cause the one or more computer processors to perform operations including obtaining machine-learning (ML) models, each model related to predicting a performance metric for an operation of a semiconductor manufacturing tool. Further, each ML model utilizes features defining inputs for the ML model. A process definition for manufacturing a product with the semiconductor manufacturing tool is received and one or more ML models are utilized to estimate a performance of the process definition used in the semiconductor manufacturing tool. Additionally, the results showing the estimate of the performance of the process are presented on a display.

In yet another general aspect, a machine-readable storage medium (e.g., a non-transitory storage medium) includes instructions that, when executed by a machine, cause the machine to perform operations including obtaining machine-learning (ML) models, each model related to predicting a performance metric for an operation of a semiconductor manufacturing tool. Further, each ML model utilizes features defining inputs for the ML model. A process definition for manufacturing a product with the semiconductor manufacturing tool is received and one or more ML models are utilized to estimate a performance of the process definition used in the semiconductor manufacturing tool. Additionally, the results showing the estimate of the performance of the process are presented on a display.

BRIEF DESCRIPTION OF THE DRAWINGS

Various of the appended drawings merely illustrate example embodiments of the present disclosure and cannot be considered as limiting its scope.

FIG. 4B is a table showing examples of modeling algorithms at different levels, according to some example embodiments.

FIGS. 9 and 10 show a table with some example features used by ML models.

DETAILED DESCRIPTION

Several kinds of modeling techniques exist, depending on the application, such as stress modeling, thermal modeling, computational fluid dynamics (CFD), plasma modeling. Monte Carlo simulations, etc. These models predict the concentration of species, temperature profiles, plasma density and associated distribution, the pressure and velocity fields of the flow, calculate relevant dimensionless numbers, etc.

Depending on the domain of interest, the spatial scale can range from nanometers to meters, and temporal spacing can be from picoseconds to minutes, which means a very wide range of spatial and temporal scales. Modeling these systems using physics-based, chemistry-based, or quantum-based methods can be very expensive and not tractable from an industrial setting because multiple design conditions need to be tested and operational ranges need to be mapped. For example, an individual process run can sometimes take longer than a week, and during the design iteration phase, the design engineer may be limited to using just two or three of such modeling efforts prior to finalizing the design.

Further, the fidelity of physics-based models generally depends on the ability to accurately predict or characterize input parameters or boundary conditions for the models. In many instances, such parameters cannot be measured directly and must be inferred from experimental results. Such challenges are particularly acute, for example, when attempting to model plasma environments that are commonplace in semiconductor wafer process equipment. Such plasmas are time-varying, both by design and due to the accumulation or removal of products or byproducts in the process equipment chamber, and inclusion of measurement probes into the plasma environment may undesirably influence the characteristics of the plasma to be examined. Also, by example, measurement of surface or interface characteristics, such as thermal contact resistances or emissivities, may be impossible or impractical with sufficient resolution to fully inform a physics-based high-fidelity model.

Purely data-driven models (e.g., machine-learning-models) are sometimes utilized to predict the behavior of complex systems. Data-driven models are statistical in nature and do not explicitly require knowledge of the physical systems being predicted. However, such models generally exhibit improving predictive value as the volume of training data increases, necessitating generation of large experimental or simulated data sets to achieve a useful model. Particularly, when the purpose of the model is to predict the behavior of a novel process, the creation of such large datasets may be impractical or impossible.

What is needed are reliable methods and systems that can quickly predict behaviors of different elements in the semiconductor manufacturing process in order to design better and faster semiconductor equipment and semiconductor manufacturing processes.

Figure 1:
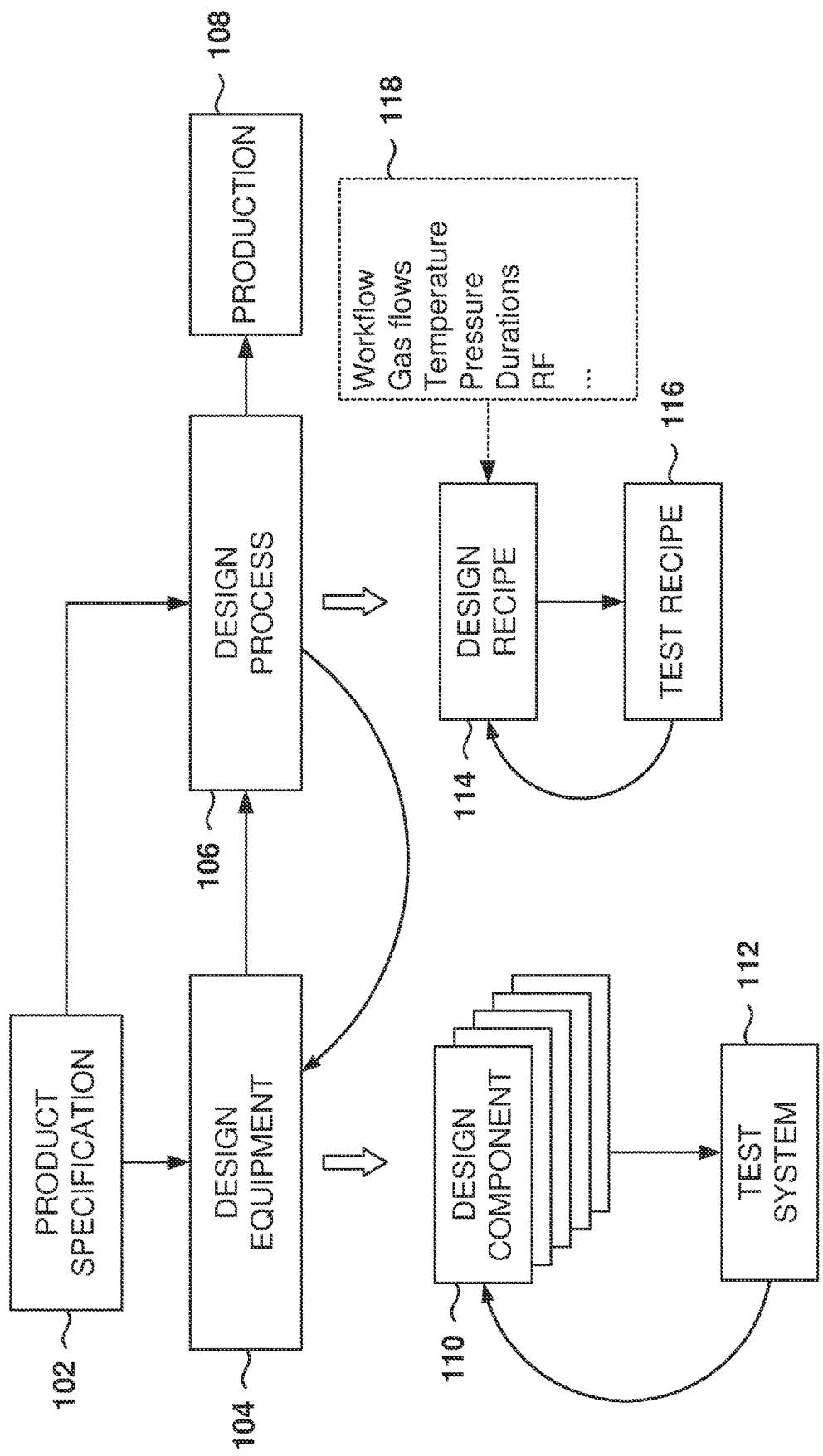
FIG. 1 illustrates the complexity of designing equipment and processes for semiconductor manufacturing.

FIG. 1 illustrates the complexity of designing equipment and processes for semiconductor manufacturing. To manufacture a semiconductor, both the equipment and the process for making the semiconductor must be designed. Based on a product specification 102, the equipment and the process are designed before the product is brought into production 108.

The equipment design 104 typically includes designing 110 many of the components of the semiconductor-manufacturing equipment, such as the geometry of the chamber, the showerhead, the pedestal, the power sources, etc. After the components are designed, the system is tested at operation 112 and the performance is measured. Typically, there are multiple cycles to finalize the design 110 of the components until the test results are satisfactory for the purpose of making the product.

One challenge of the design team is that the equipment (e.g., the chamber) must be designed before the process is even determined. Therefore, the equipment is designed to satisfy generic needs, and not the particular requirements for a given product. In some cases, the design process may generate feedback to the equipment design 104, and the equipment is redesigned based on the testing of the process. However, redesigning the equipment, following a new process design, is expensive and time consuming.

On the process design 106 side, a recipe 118 is designed 114, which includes the definition of the process, such as the workflow, the fluid flows, the temperature setting for the chamber, the pressure in the chamber, durations of the different steps, radiofrequency (RF) power applied, chemistry concentration, electrical bias, etc. Designing a recipe is an art where design experts define the recipe based on past experience.

After the recipe 118 is designed, the recipe 118 is tested 116 in the semiconductor-manufacturing equipment. However, multiple cycles of recipe design 114 and testing 116 are typically required in order to find a satisfactory recipe 118 to generate the product during production 108.

Both the equipment design 104 and the process design 106 are expensive and tend to take a long time, such as weeks, months, or years for each iteration. In order to accelerate the design, simulations are sometimes used in order to perform testing without doing an actual test on the semiconductor-manufacturing equipment.

For example, in order to predict uniformity on the substrate, the pedestal and the showerhead are modeled to predict the interactions between them using a physics-based model that makes predictions based on the physical aspects of the elements of the chamber. However, the physical models take a long time to execute, and to test a condition using simulation may take from a few hours to multiple days.

Physics-based simulation is using the laws of physics to predict the behavior of the element, and may include solving conservation equations, boundary or mesh nodes, within a system. The physics-based simulations are typically used when it is not possible to observe the evolution and outcome of a process, such as observing what happens within the chamber.

There are also behavioral models that describe the output of the manufacturing process based on an analytical formulation. One example simulation tool is SEMulator3D® from Lam Research, which provides a voxel model of a semiconductor process based on the expected behavior as simulated by a behavior model. The behavior model does not directly simulate the behavior of particles within the chamber, but rather measures the results of the operations (e.g., deposition thickness on the substrate).

Current approaches towards solving the challenges for uniform deposition (verified on blanket wafers) and conformal deposition (verified in patterned wafers) are highly experimental. Modeling and simulations can help in the current workflow for component design and prediction of fill performance, but these are often slow (e.g., first-principles/ physics-based computational methods depend on the multi-physics problem and mesh size, often resulting in days or weeks per simulation), do not always address all the relevant physics (e.g., system complexity and state-of-the-art, cutting-edge technology do not always have well defined physics), may be based on non-physical methods such as behavior-based simulations (e.g., not all behaviors are captured in modeling software), and generally require experimental data for calibration.

Behavioral-model simulations for feature performance predictions have been employed in processes. However, these models are limited by the fact that the models are calibrated based on experimental data and employ non-physical parameters to optimize the geometry of a feature. Behavioral models cannot be used for the complete system and the behavior may vary from structure to structure, which requires different calibrations that mean additional testing to capture the data for the model.

There are also limitations on the available experimental data. Although data from experiments is the ultimate ground truth of what is seen on the wafer and within a feature, these models based on data do not allow for transferring the learning gained to other systems. For example, macroscopic parameters (e.g., global pressure, wafer temperature, flow rates) do not account for capturing the fundamental flow field, charge density, flux transport, and other microscopic parameters that define the fundamental learning of a system. In some cases, there is no correlation directly observable between experimental and simulation data, and such learning cannot be expanded to other designs.

To summarize, current methods employ different approaches separately (modeling, behavior-based simulation, experiments) and do not have a way to "learn" from these separate data sources and expand the "insight" into other chamber designs. Experimental data is often the only reliable result that requires several expensive iterations of design, resulting in longer product release cycles.

Figure 2:
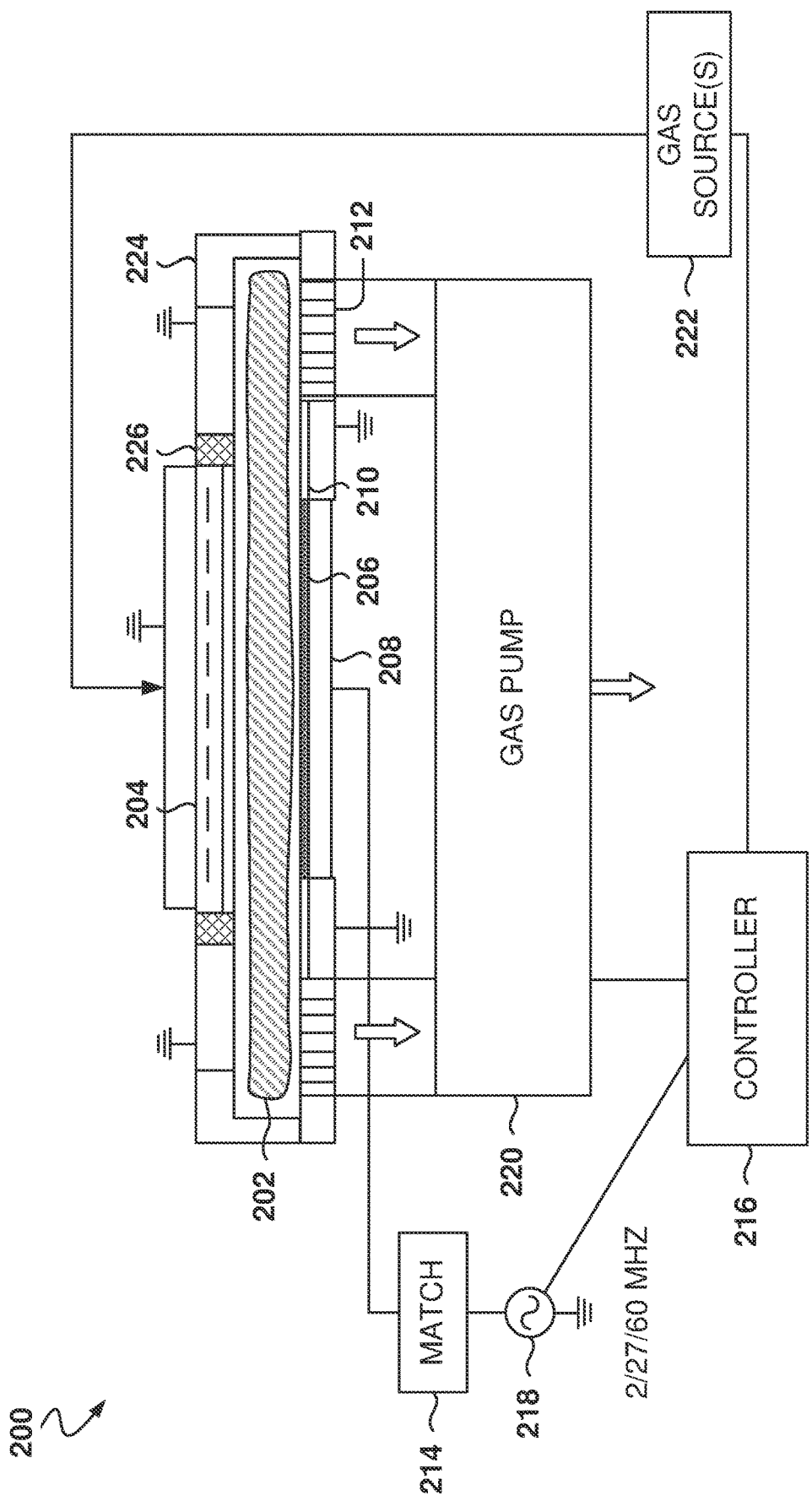
FIG. 2 is an etching chamber, according to some example embodiments.

FIG. 2 is an etching chamber 200, according to one embodiment. Exciting an electric field between two electrodes is one of the methods to obtain radiofrequency (RF) gas discharge in an etching chamber. When an oscillating voltage is applied between the electrodes, the discharge obtained is referred to as a Capacitive Coupled Plasma (CCP) discharge.

Plasma 202 may be created utilizing stable feedstock gases to obtain a wide variety of chemically reactive by-products created by the dissociation of the various molecules caused by electron-neutral collisions. The chemical aspect of etching involves the reaction of the neutral gas molecules and their dissociated by-products with the molecules of the to-be-etched surface, and producing volatile molecules, which can be pumped away. When plasma is created, the positive ions are accelerated from the plasma across a space-charge sheath separating the plasma from chamber walls to strike the wafer surface with enough energy to remove material from the wafer surface. This is known as ion bombardment or ion sputtering. Some industrial plasmas, however, do not produce ions with enough energy to efficiently etch a surface by purely physical means.

A controller 216 manages the operation of the chamber 200 by controlling the different elements in the chamber 200, such as RF generator 218, gas sources 222, and gas pump 220. In one embodiment, fluorocarbon gases, such as $CF_4$ and $C-C_4F_8$, are used in a dielectric etch process for their anisotropic and selective etching capabilities, but the principles described herein can be applied to other plasma-creating gases. The fluorocarbon gases are readily dissociated into chemically reactive by-products that include smaller molecular and atomic radicals. These chemically reactive by-products etch away the dielectric material, which in one embodiment can be $SiO_2$ or SiOCH for low-k devices.

The chamber 200 illustrates a processing chamber with a top electrode 204 and a bottom electrode 208. The top electrode 204 may be grounded or coupled to an RF generator (not shown), and the bottom electrode 208 is coupled to RF generator 218 via matching network 214. RF generator 218 provides RF power in one, two, or three different RF frequencies. According to the desired configuration of the chamber 200 for a particular operation, at least one of the three RF frequencies may be turned on or off. In the embodiment shown in FIG. 2. RF generator 218 provides 2 MHz, 27 MHz, and 60 MHz frequencies, but other frequencies are also possible.

The chamber 200 includes a gas showerhead on the top electrode 204 to input gas into the chamber 200 provided by gas source(s) 222, and a perforated confinement ring 212 that allows the gas to be pumped out of the chamber 200 by gas pump 220. In some example embodiments, the gas pump 220 is a turbomolecular pump, but other types of gas pumps may be utilized.

When the substrate 206 is present in the chamber 200, a silicon focus ring 210 is situated next to the substrate 206 such that there is a uniform RF field at the bottom surface of the plasma 202 for uniform etching on the surface of the substrate 206. The embodiment of FIG. 2 shows a triode reactor configuration where the top electrode 204 is surrounded by a symmetric RF ground electrode 224. Insulator 226 is a dielectric that isolates ground electrode 224 from top electrode 204.

Each frequency may be selected for a specific purpose in the wafer manufacturing process. In the example of FIG. 2, with RF powers provided at 2 MHz, 27 MHz, and 60 MHz, the 2 MHz RF power provides ion energy control, and the 27 MHz and 60 MHz powers provide control of the plasma density and the dissociation patterns of the chemistry. This configuration, where each RF power may be turned on or off, enables certain processes that use ultra-low ion energy on the substrates or wafers, and certain processes (e.g., soft etch for low-k materials) where the ion energy must be low (under 200 or 200 eV).

In another embodiment, a 60 MHz RF power is used on the top electrode 204 to get ultra-low energies and very high density. This configuration allows chamber cleaning with high density plasma when the substrate 206 is not in the chamber 200, while minimizing sputtering on the electro static chuck (ESC) surface. The ESC surface is exposed when the substrate 206 is not present, and any ion energy on the surface should be avoided, which is why the bottom 2 MHz and 27 MHz power supplies may be off during cleaning.

Figure 3:
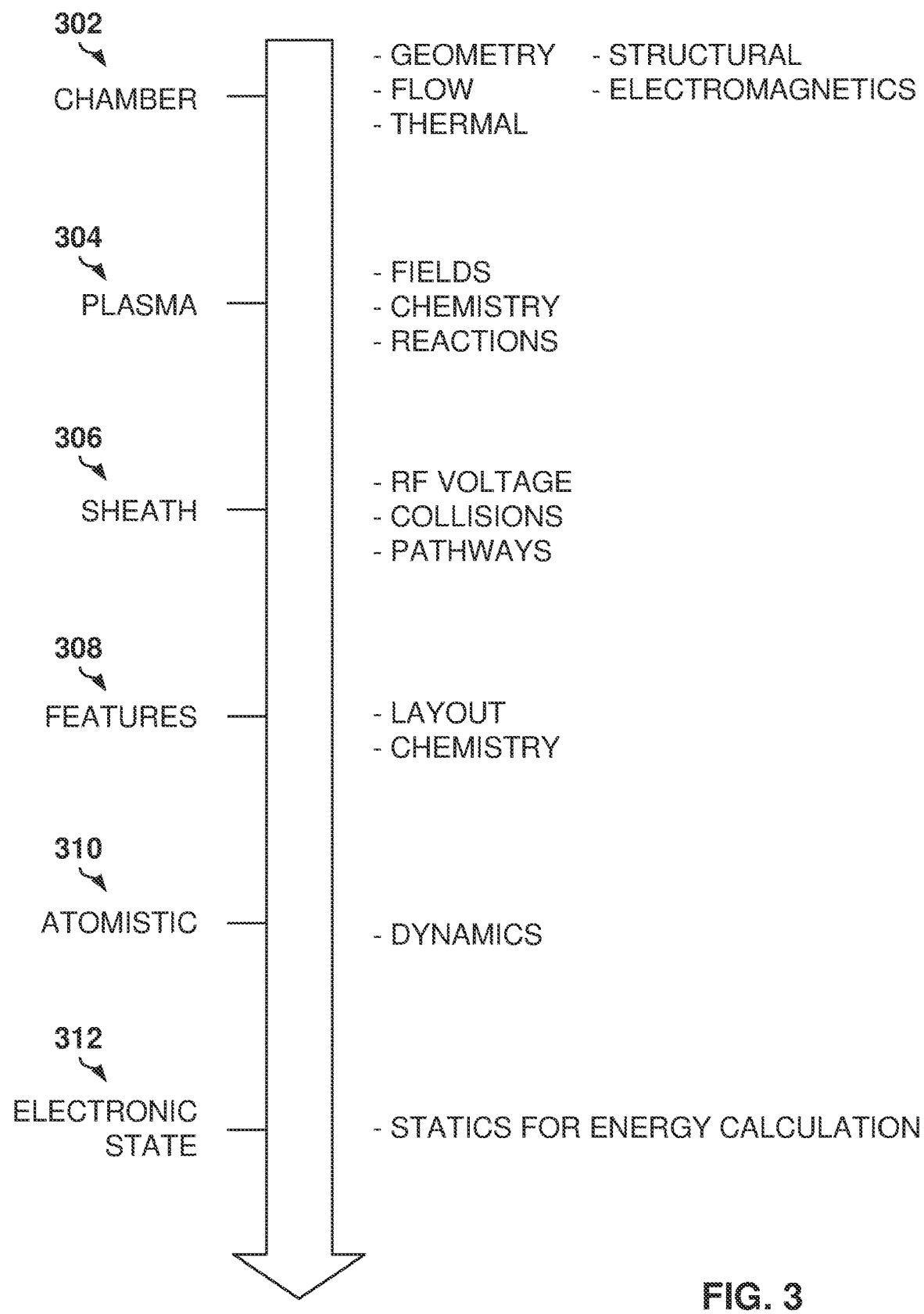
FIG. 3 illustrates feature modeling at multiple levels in the semiconductor manufacturing, according to some example embodiments.

FIG. 3 illustrates feature modeling at multiple levels in semiconductor manufacturing, according to some example embodiments. Embodiments presented herein describe how to build a tool that predicts the behavior and performance of semiconductor manufacturing equipment.

This type of tool to predict the behavior of a physical entity has been referred to as a digital twin, also referred to herein as system model. The digital twin is a digital replica of a living or non-living physical entity and refers to a digital replica of potential and actual physical assets (physical twin), processes, people, places, systems and devices that can be used for various purposes. Digital twins emphasize the connection between the physical model and the corresponding virtual model or virtual counterpart, and this connection may be reinforced by generating real-time data using sensors.

The digital twin learns and updates itself from multiple sources to represent its near real-time status, working condition, or position. This learning system learns from itself (e.g., using sensor data that conveys various aspects of its operating condition), from human experts (e.g., design engineers), from other machines, and from the environment of which it may be a part. The digital twin also integrates historical data from past machine usage to factor into its digital model.

In some example embodiments, the digital twin for the semiconductor manufacturing equipment utilizes the various disconnected datasets generated from first-principle physics-based simulations, approximate empirical methods (reduced order models, approximate models, etc.), experimental data, and other data sources (e.g., chamber sensor). Further, the digital twin employs ML techniques such as statistical modeling, deep neural networks, recurrent neural networks, convolutional neural networks, to generate a physics-constrained data-driven surrogate hybrid model that is predictive, high fidelity, and accurate.

The digital twin can be applied, for instance, to analyze the impact of etch chamber design on wafer etch uniformity. For example, chamber flow simulation provides information on fluid flow fields, pressure fields, concentration gradients, etc. Plasma simulations provide charged-species density and fluxes to the wafer, as well as plasma parameters in the process window of interest.

Exponential data provides partial sensor information that can be correlated to upstream simulation data and inputs, and contains the output variable, which is the on-wafer uniformity on blanket wafers and/or feature profile characteristics (e.g., depth, critical dimension (CD), tilt, selectivity, mask loss) across the wafer. Individually, the high-fidelity simulations are not expected to exactly match on-wafer experimental performance metrics and experimental data alone will not provide physical characteristics of the chamber such as flow fields, plasma properties, etc. A hybrid-model solution aids in providing insight from these detached, but related, datasets and can aid in product design, engineering, and development.

The system hybrid model may include separate sub-models that cover different aspects of the equipment and these sub-models may interact with each other as described below with reference to FIG. 4A.

Referring to FIG. 3, in some example embodiments, the sub-models include a chamber model 302, a plasma model 304, a sheath model 306, a wafer features model 308, an atomistic model 310, and an electronic state model 312. Each model uses respective features and training data to predict the respective behaviors. More details about building the models are provided below with reference to FIG. 5, and more details about the respective features are provided below with reference to FIGS. 9-10. Further, each of the sub-models may also be divided into separate models.

The chamber model 302 is for predicting chamber-related phenomena, such as geometry of the chamber, flow rates, thermal information, structural information, and electromagnetics. The plasma model 304 is for predicting plasma performance, such as electromagnetic fields, plasma chemistry, and reactions data.

The sheath model 306 is for predicting sheath data, such as RF voltages, electromagnetic fields, reaction collation cross-sections, and reaction pathways. The wafer features model 308 is for predicting wafer features including layout (e.g., design layout, mask layers) and chemistry (e.g., on-wafer fluxes, material properties).

The atomistic model 310 predicts phenomena at the atomic level, such as atomic dynamics including lattice structure, species distribution and diffusion coefficients. The electronic state model 312 is for predicting states for energy calculation, such as energy states and cluster configuration.

Embodiments presented provide the advantage of determining constitutive relationships between the different models that have been generated in isolation for specific problems on a given system or process. These separate datasets are combined to build the system model that can be used for design and process optimization on semiconductor manufacturing.

These models encompass different spatial scales (e.g., in the order of meters to nanometers) and temporal scales (e.g., from transient processes such as pulsing systems to steady state conditions under equilibrium). The system model results in cost savings (e.g., use of chemicals, reduce the sign iterations) as well as development-time savings as the design and testing of the system is performed much faster than with previous methodologies (e.g., reducing new reactor and process design time from 18-24 months to less than 1% car).

Figure 4A:
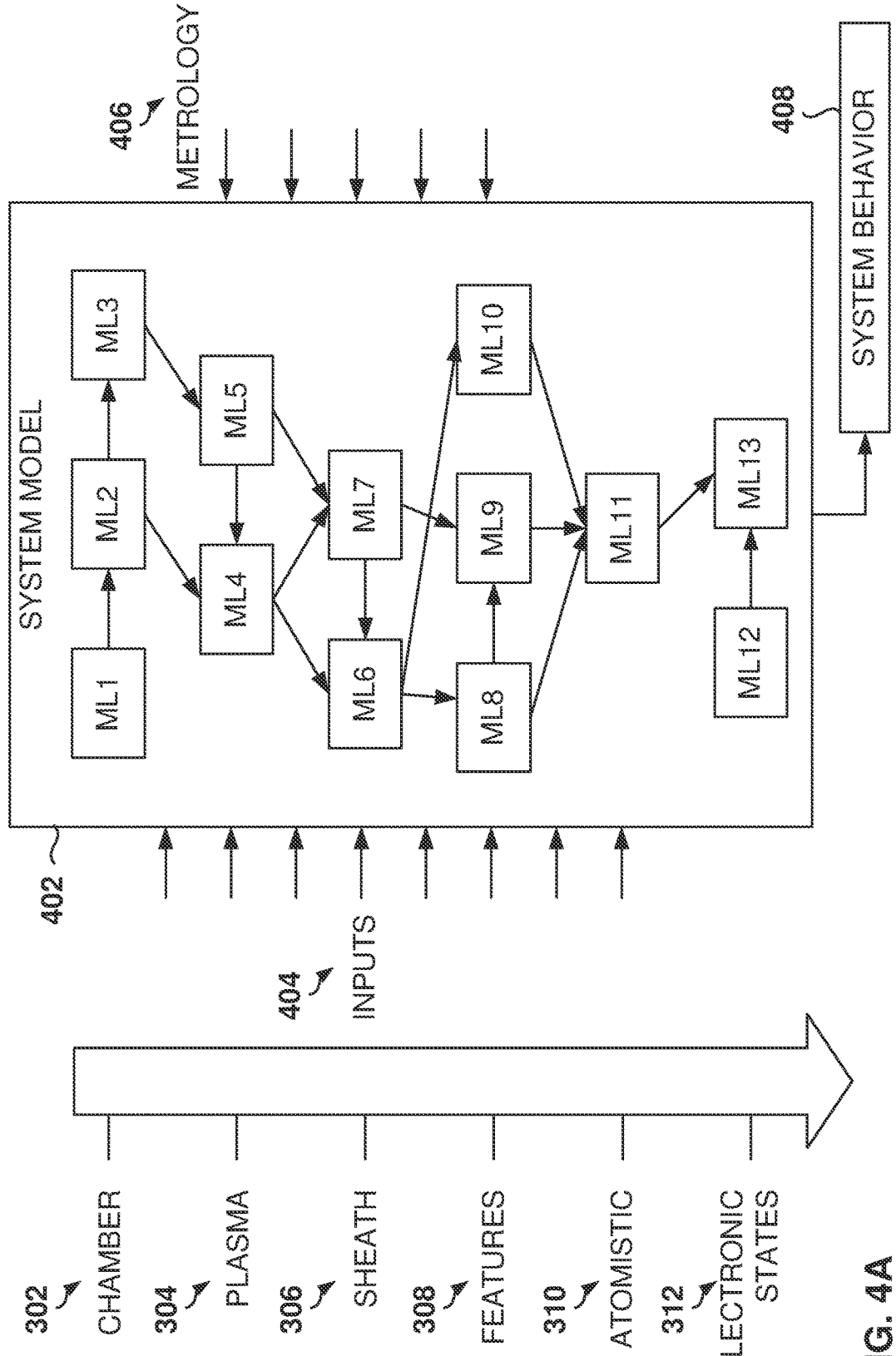
FIG. 4A illustrates the interactions between multiple machine-learning models to predict process behavior, according to some example embodiments.

FIG. 4A illustrates the interactions between multiple machine-learning models to predict process behavior, according to some example embodiments. The system model 402 comprises a plurality of ML models ML1-ML13 at the different levels of predictions. Each level includes one or more ML models that can interact with each other and with ML models at other layers. In some example embodiments, the models include behavioral models and physics-based models.

The models include inputs 404 (e.g., pressure, temperature, flows) and generate outputs related to behavior. The output of the system model 402 is the system behavior 408.

The inputs 404 may also include metrology 406 data obtained from sensors. Further, the inputs 404 may also include metrology 406 data from the incoming substrate prior to the application of the process being modeled. The metrology 406 provides measurements of the experiments and includes items such as layer thickness, resistivity, film properties data, etc. Image analysis may be used to examine the experiment results, but other types of metrology 406 may also be used.

The metrology 406 includes one or more of Imaging Methods (e.g., Scanning Electron Microscopy (SEM)). Transmission Electron Microscopy (TEM)), typical-thickness measurement (e.g., X-Ray Fluorescence (XRF), Ellipsometry), sheet resistance, surface resistivity, stress measurement, and other analytical methods used to determine layer thickness, composition, grain orientation, etc. These other analytical methods include one or more of X-Ray Diffraction (XRD), X-Ray Reflectivity (XRR), X-Ray Photoelectron Spectroscopy (XPS), Precession Electron Diffraction (PED), Electron Energy Loss Spectroscopy (EELS). Energy Dispersive X-ray Spectroscopy (EDS), Secondary Ion Mass Spectroscopy (SIMS), etc.

In some embodiments, the raw metrology data 406 may be conditioned by dedicated ML algorithms for each metrology source, or, in some embodiments, with ML algorithms which take inputs from multiple metrology sources. The metrology sources in the semiconductor industry can produce enormous amounts of data and discriminating useful data from any individual source is often a difficult problem. The difficulty is magnified exponentially if data from many sources needs to be considered in aggregate. Tasking dedicated ML algorithms to condition the incoming metrology data allows for the construction of a more efficient system model 402. The output of each metrology conditioning algorithm is a ROM, and each component ML in the system model can select only the output parameters relevant to its own operation.

In some example embodiments, the metrology includes time-series data, which includes sensor measurements taken over time for a given parameter, such as how the pressure in the chamber evolves over time during the manufacturing process.

The inputs 404 may include controls for pressure, flow rates, power, temperature, etc., and all these inputs 404 affect the chamber model 302 behavior. At the chamber model 302 level, there are flow fields, ion densities, neutron densities, etc. Then there is the plasma model 304 level including items like electric fields, current densities, chemistries, etc. If there is no plasma, then there are different species in the chamber. Further, if the bias is powered, when there is plasma deposition there is a sheath and then controls are used to modify redistribution functions.

Further, there is the wafer features model 308 level, where the wafer feature becomes observable. Typically, models are provided for a single level, although some models may include more than one level. Each model takes into consideration particular features to obtain respective predictions. The outputs of the model may then be used for other models that operate at the same level or at other levels.

During chamber design, different options can be explored (e.g., changing showerhead hole distribution, the gap between the wafer and the showerhead), and the goal is to achieve certain metrics on the wafer, such as having uniform profiles. The designer develops with a configuration of the chamber (e.g., chamber knobs, geometries) and a recipe, and the system model 402 makes a prediction of the system behavior 408 that includes metrics on the performance of the wafer. The system model 402 can identify not only the performance on the wafer, but also information on what is happening in the chamber (e.g., plasma, temperature being too high or too low).

If the performance is not satisfactory, the designer can change certain parameters and repeat the process to see the effect, such as by changing one or more variables at a time (e.g., pressure, chemistry, timing). But using the ML models, this process is quick (e.g., minutes or hours) instead of having to wait weeks or months for the results. The system model 402 is able to evaluate performance impact when making changes to the hardware or to the process recipe.

One advantage of combining the models is to find correlations between the multiple models that were generated in isolation for specific problems on a given system/subsystem/process and combine these separate datasets to build the system model 402 that can be used for design and process optimization on features of interest.

Using such techniques, it is possible to build models from different spatial scales (chamber~order of m to feature~order of nm) and temporal scale (transient processes such as pulsing systems, to steady state conditions under equilibrium). This enables better understanding of impact on end desired state (e.g., process fill) based on design conditions. It was not possible to do this accurately on complex deposition chambers as the path from chamber level simulation to surface kinetics on wafer is not direct. Using the system model 402 results in savings of wafer and chemicals from the process standpoint and minimizes expensive design iterations.

FIG. 4B is a table 412 showing examples of modeling algorithms at different levels, according to some example embodiments. The different areas include etch/atomic layer etch, electrofill, plasma enhanced (PE) chemical vapor deposition (CVD) and atomic layer deposition (ALD), clean and strip, physical vapor deposition, and chemical/mechanical polishing. Some of the embodiments are described with reference to etching, but the same principles may be applied to the other areas.

Figure 5:
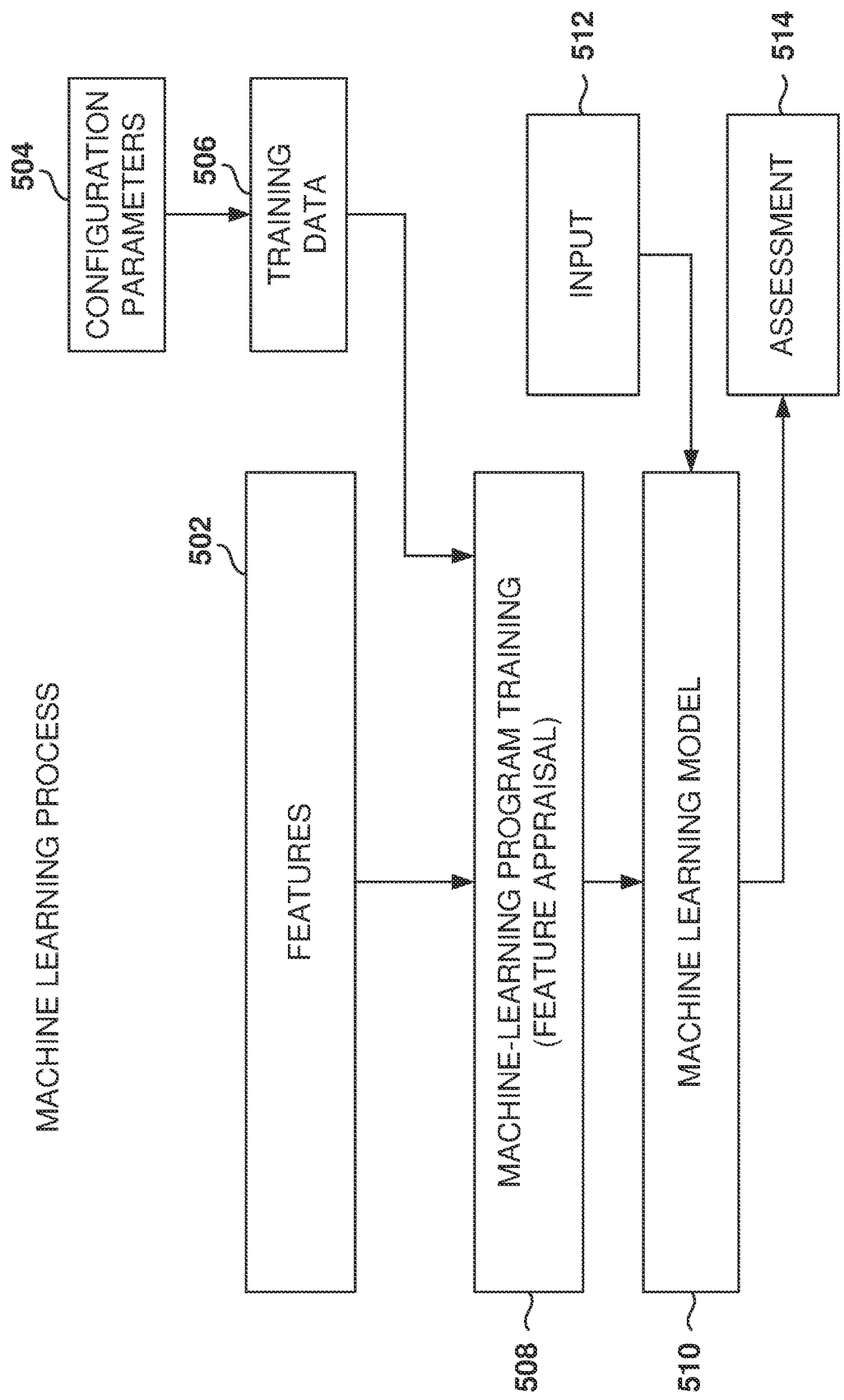
FIG. 5 illustrates the training and use of a machine-learning (ML) program, according to some example embodiments.

FIG. 5 illustrates the training and use of a machine-learning program, according to some example embodiments. In some example embodiments, machine-learning programs (MLPs), also referred to as machine-learning algorithms or tools, am utilized to perform operations associated with searches, such as job searches.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 510 from example training data 506 in order to make data-driven predictions or decisions expressed as outputs or assessments 514. Although example embodiments are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is important so that the training is able to identify the correlations within the data.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs Unsupervised ML is the training of an ML algorithm using information that is neither classified nor labeled and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms am Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

The training data 506 comprises examples of values for the features 502. In some example embodiments, the training data 506 comprises labeled data with examples of values for the features 502 and labels indicating the outcome, such as plasma properties, gas densities, gas flows, etch rates, etch uniformity, etc.

In some example embodiments, the training data 506 is obtained by performing experiments on the semiconductor manufacturing equipment, and the data resulting from the experiments is used for the ML training 508. Further, training data 506 may also be obtained by performing simulations. (e.g., physics-based simulations, behavior-based simulations) and the results (e.g., etch uniformity on the wafer, uniform deposition on the wafer) from the simulations are used for the ML training 508.

The machine-learning algorithms utilize the training data 506 to find correlations among identified features 502 that affect the outcome. A feature 502 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs. More details about features 502 used by the ML models 510 are provided below with reference to FIGS. 9 and 10.

During training 508, the ML algorithm analyzes the training data 506 based on identified features 502 and configuration parameters 504 defined for the training 508. The result of the training 508 is an ML model 510 that is capable of taking inputs to produce assessments.

In some embodiments, example ML models provide estimates at different levels of the semiconductor manufacturing process, as illustrated above with reference to FIGS. 3 and 4.

Training an ML algorithm involves analyzing large amounts of data (e.g., from several gigabytes to a terabyte or more) in order to find data correlations. The ML algorithms utilize the training data 506 to find correlations among the identified features 502 that affect the outcome or assessment 514. In some example embodiments, the training data 506 includes labeled data, which is known data for one or more identified features 502 and one or more outcomes.

The ML algorithms usually explore many possible functions and parameters before finding what the ML algorithms identify to be the best correlations within the data; therefore, training may require large amounts of computing resources and time.

Many ML algorithms include configuration parameters 304, and the more complex the ML algorithm, the more parameters there are that are available to the user. The configuration parameters 504 define variables for an ML algorithm in the search for the best ML model. The training parameters include model parameters and hyperparameters. Model parameters are learned from the training data, whereas hyperparameters are not learned from the training data, but instead are provided to the ML algorithm.

Some examples of model parameters include maximum model size, maximum number of passes over the training data, data shuffle type, regression coefficients, decision tree split locations, and the like. Hyperparameters may include the number of hidden layers in a neural network, the number of hidden nodes in each layer, the learning rate (perhaps with various adaptation schemes for the learning rate), the regularization parameters, types of nonlinear activation functions, and the like. Finding the correct (or the best) set of hyperparameters can be a very time-consuming task that requires a large amount of computer resources.

When the ML model 510 is used to perform an assessment, input 512 is provided to the ML model 510, and the ML model 510 generates the assessment 514 as output. For example, when analyzing gas flow distribution for a showerhead, the output may indicate a time series of the gas density throughout the surface of the wafer.

For example, an ML model 510 to detect complete coverage when filling a deep trench on the wafer can provide an estimate indicating the level of coverage on the trench, where 100% means coverage and less than that means the existence of a void in the filling.

Feature extraction is a process to reduce the amount of resources required to describe a large set of data. When performing analysis of complex data, one of the major problems is one that stems from the number of variables involved. Analysis with a large number of variables generally requires a large amount of memory and computational power, and it may cause a classification algorithm to overfit to training samples and generalize poorly to new samples. Feature extraction includes constructing combinations of variables to get around these large-data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or a similar, amount of information.

In some example embodiments, feature extraction includes obtaining values of the features (as described in FIGS. 9 and 10) and converting those values to vectors or matrices if needed. In some cases, the vectors or matrices are processed to reduce their dimensions in order to provide the information in a more compact way to the ML model 510. Further, data from multiple features may be combined, such as by concatenating vectors from multiple inputs into a single vector.

Figure 6:
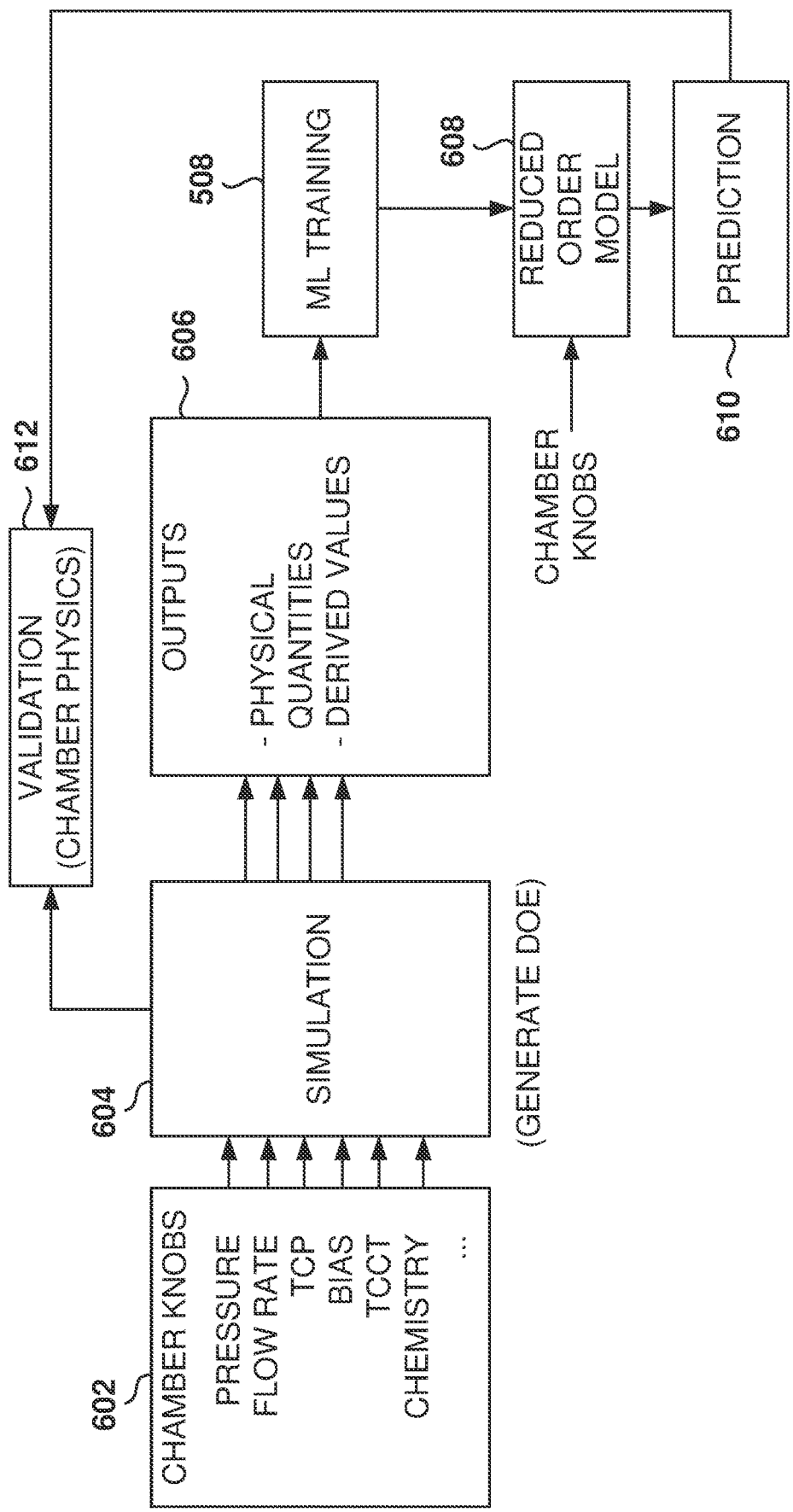
FIG. 6 illustrates the process for plasma reduced order model (ROM) simulation, according to some example embodiments.

FIG. 6 illustrates the process for plasma reduced order model (ROM) simulation, according to some example embodiments. Although the example embodiment is described with reference to plasma properties, the same principles may be applied in other areas, such as for thermal processes. In some example embodiments, the goal is to derive a reduced order model (ROM), also referred to herein as digital twin, for a semiconductor manufacturing chamber using physics-based simulations, behavior-based simulations, Wafer Data Logs (WDL) (which contain time-series information generated from sensors), and ML models.

A ROM is a simplification of a complex model that captures the behavior of a system so engineers can quickly study a system's dominant effects using minimal computational resources. ROM enables engineers to achieve shorter design cycles to produce higher quality products.

Chamber knobs 602 are the configurable parameters used as inputs to the simulation 604. The chamber knobs 602 include any of the configurable parameters for the manufacturing process, such as pressure, flow rate, transformer coupled plasma (TCP), bias, transformer coupled capacitive tuning (TCCT), chemistry information, etc.

A design of experiment (DOE) matrix is created for the simulation 604. DOE is a branch of applied statistics that deals with planning, conducting, analyzing, and interpreting controlled tests to evaluate the factors that control the value of a parameter or group of parameters. DOE is a powerful data collection and analysis tool that can be used in a variety of experimental situations.

In some example embodiments, the simulation 604 is a physics-based simulation, but other embodiments may utilize other types of simulations, such as behavior-based simulations. Typically, more than one simulation is performed and the results are outputs 606 that include physical quantities data as well as derived values obtained in the simulations 604. For example, a simulation might generate a prediction that includes flow fields, ion densities, energy distribution, species distribution, etc.

The results of the simulations 604 are used as training data for the ML training 508 to create the ROM 608. The ROM 608 receives as input the configuration of the chamber knobs 602 to generate a prediction on the performance of a particular design and process.

For example, two designs are being considered for a showerhead. Each design may be defined, for example, by a respective computer-aided design (CAD) geometry (e.g., number and distribution of holes in the showerhead) and gas flows. The two designs are input to the ROM 608 and the results are obtained. The performance parameters being considered for improvements of the showerhead are then compared to see which showerhead design is better.

Since comparing performance using the ROM 608 does not require actual experiments on the chamber, the results are obtained very quickly (e.g., minutes or hours), instead of having to wait days or weeks to obtain the results for each design. Since testing designs is so much faster, the design engineer has the ability to test multiple designs by fine-tuning one or more parameters at a time until a satisfactory design is found.

Additionally, the ROM 608 can be validated (e.g., its accuracy in formulating predictions can be checked) by comparing the results generated by simulations 604 to predictions 610 generated by the ROM 608 when using the same chamber knobs 602 configuration. This way, the ROM 608 can be continuously enhanced until the predictions 610 are substantially similar to the results of the simulations 604. It is noted that, in general, the ROM 608 is much faster than the simulation 604 (e.g., physics-based simulations), which requires solving complex mathematical equations with many related variables. Thus, having an accurate ROM 608 greatly accelerates the development process.

Figure 7:
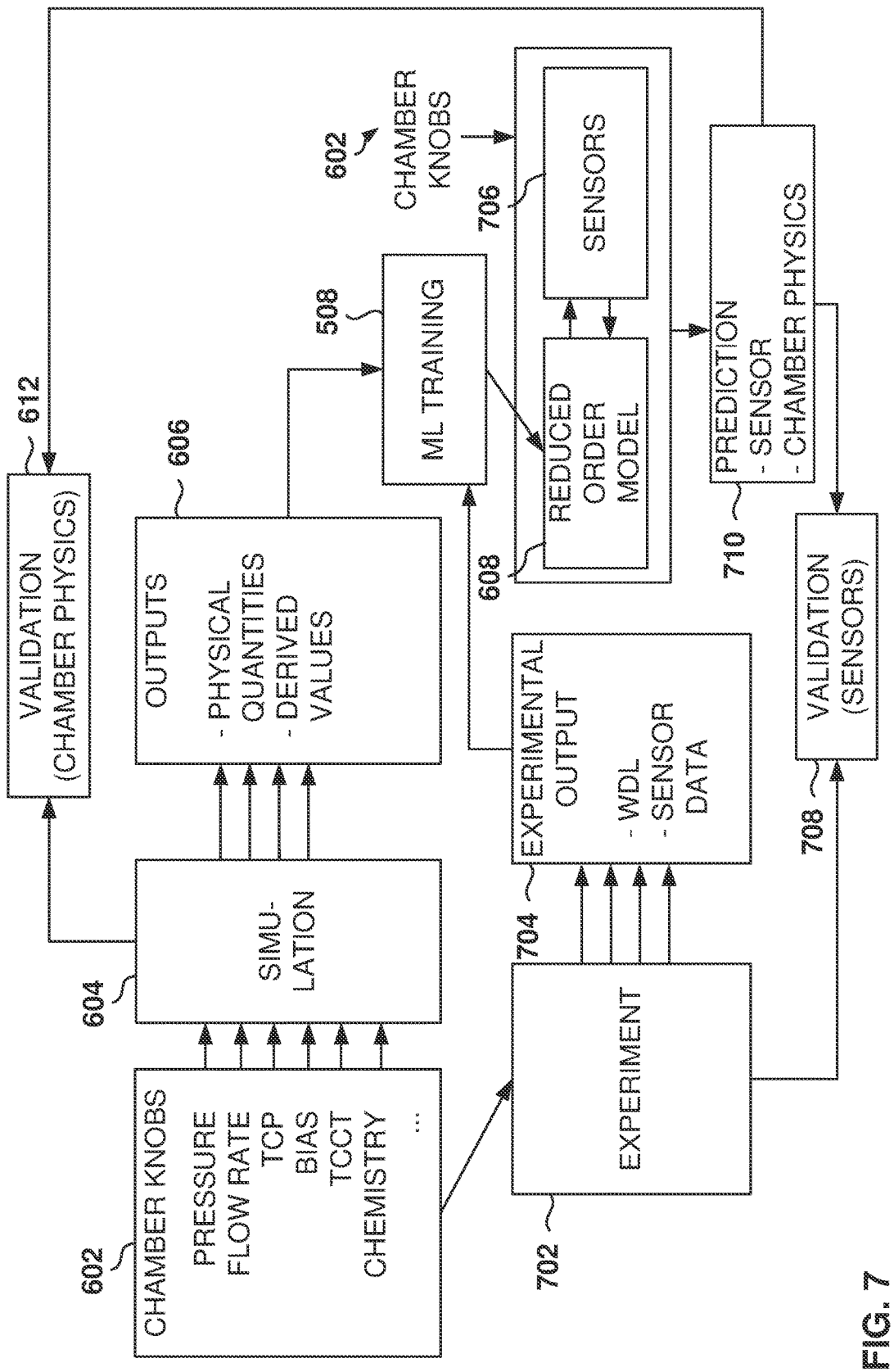
FIG. 7 illustrates the process for plasma ROM using simulation and experimentation, according to some example embodiments.

FIG. 7 illustrates the process for plasma ROM using simulation and experimentation, according to some example embodiments. Although the example embodiment is described with reference to plasma properties, the same principles may be applied in other areas, such as for thermal processes. The method described above with reference to FIG. 6 can be enhanced by using actual experiments 702 perform using a semiconductor manufacturing tool. Of course, using actual experimentation is more expensive than simulations 604 and requires more time to set up and execute. The use of experimental data improves the quality of the prediction results.

The experimental outputs 704 resulting from the experiments 702 may also be used as additional data for the ML training 508 to obtain the ROM 608. Further, the data from sensors 706, obtained during the experiments 702, can be used for training and as an input to the ROM 608. The ROM 608 then makes predictions 710 based on the chamber knobs 602 used as input. Therefore, the ROM 608 benefits from training data 506 derived from experiments 702 and simulations 604. Further, the data from the experiments 702 is validated 807 with the output of the predictions 710.

As with the simulation 604, the results from the experiments may be used to validate the ROM 608 predictions 710. Based on the validation, the ROM 608 may be fine-tuned, such as by changing the hyperparameters for the configuration using during the NIL training 508.

For example, a study of the design impact on film non-uniformity on the wafer includes simulation data with information on fluid flow fields, pressure fields, concentration gradients, etc. Experimental data contains partial sensor information that can be correlated to upstream simulation data and inputs, but mainly contains the output variable, which is the film non-uniformity or step coverage variation across a 300 mm wafer.

In some implementations, a behavioral model based on process understanding may be used. Other data inputs such as chamber sensor information and process recipe conditions can be provided to further enhance the model. The model generated is part of existing datasets computed for different purposes, and the model is capable of online learning based on new experimental and simulation data. By themselves, the high-fidelity simulations were not able to match experimental performance on wafer such as non-uniformity matching; and by itself, experimental data was not able to understand physical characteristics of the system such as flow fields, fluxes, etc. The use of the ROM 608 aids in learning from these detached datasets and assists in design engineering on future systems.

Further, other applications include the design optimization of thermo-fluidic systems with conjugate heat transfer as seen in high temperature showerhead/pedestal applications, mass transport and bias optimization in wet processing chambers, plasma driven process systems, or other atomic layer deposition applications.

Figure 8:
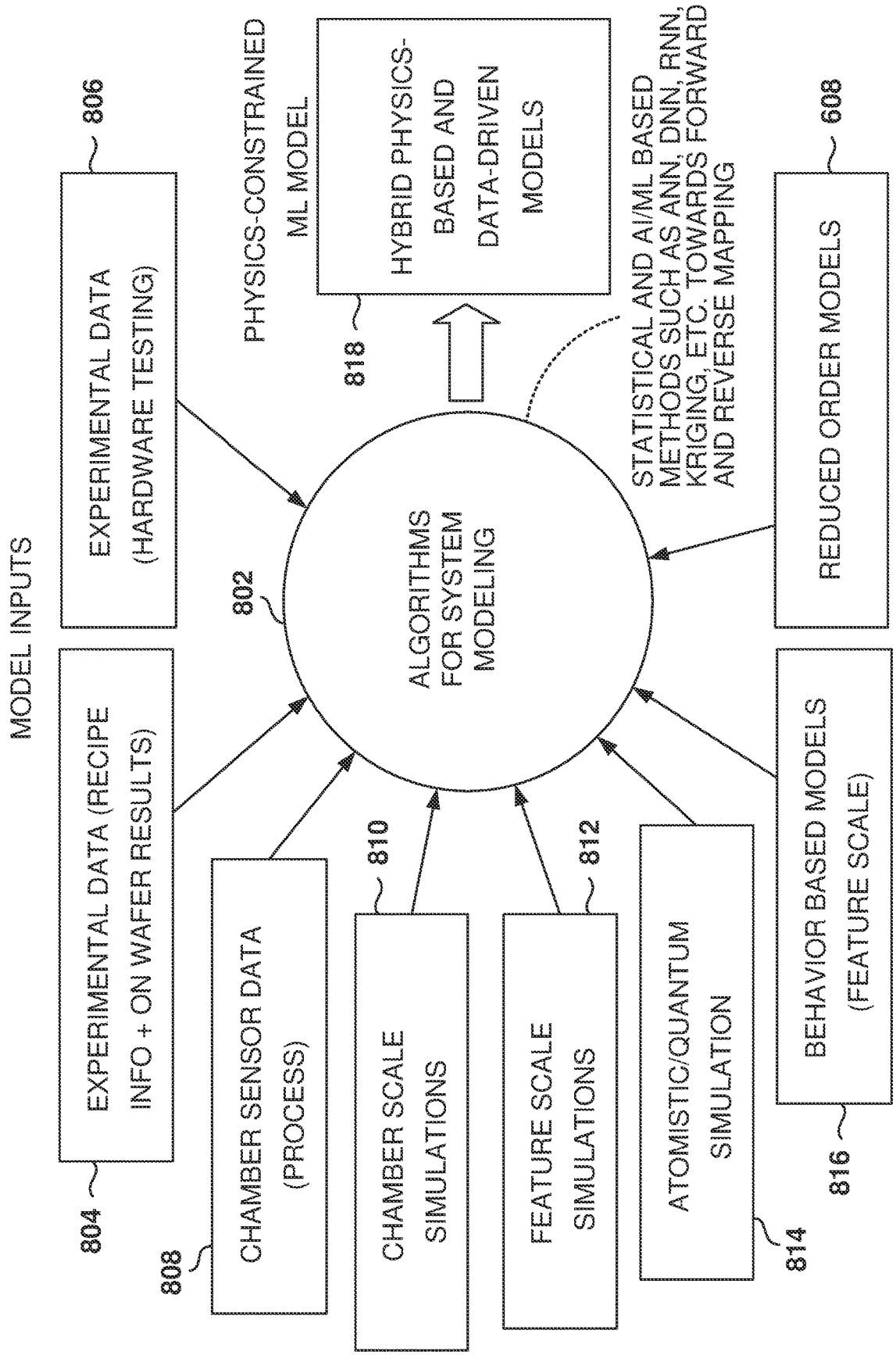
FIG. 8 illustrates some of the inputs for ML models, according to some example embodiments.

FIG. 8 illustrates some of the inputs for ML models, according to some example embodiments. Several inputs are used as data for the algorithms 802 used for system modeling. The inputs include experimental data 804 obtained from recipe information and on-wafer results, experimental data 806 resulting from hardware testing, chamber sensor data 808 obtained during semiconductor manufacturing operation, chamber-scale simulations 810, feature-scale simulations 812, atomistic/quantum simulations 814, behavior-based models 816 at the feature scale, and reduced order models 608.

The result is a physics-constrained ML model(s) 818 that predicts the performance of equipment and processes. The physics-constrained ML model 818 allows the designer to set the controls for the chamber to get the desired results, which means better predictability on wafer properties and reduced development time.

FIGS. 9 and 10 show a table with some example features used by ML models. The first column indicates the scale (e.g., the level in the hierarchy described above with reference to FIG. 3), the second column indicates the phenomena being observed, the third column presents the inputs, and the fourth column presents the outputs. Each row represents a respective ML model.

The first model is for the geometry of the chamber with the input including the design dimensions of the chamber (e.g., chamber diameter, wafer diameter). The output includes the specific geometric design for the chamber that can be in the form of a CAD file or some other geometric description such as a mesh of geometric shapes.

The next model is for the flow in the chamber. The inputs include, at least, flow rates, chamber pressure, chemistry, and flow transients. The outputs include, at least, pressure and velocity fields, species concentration throughout the chamber, and diffusion fluxes.

The next model is for the thermal study in the chamber and the inputs include, at least, heat fluxes, heat transfer coefficients, thermal conductivities, heat capacity, and area of contact. The output is temperature information throughout the chamber, heat fluxes (e.g., radiation, conduction, and convection), and heat losses.

The next model is for the structural analysis of the chamber and inputs include, at least, structural loads, reactions, tolerances, temperature, gradient, and pressure. Outputs include structural stress, strain, deflection, creep rate, fatigue, and elasticity/plasticity.

The final model for the chamber is for the electromagnetics estimate within the chamber, and the inputs include, at least, voltage, current, frequency, inductance, capacitance, and impedance. The outputs include electric field, magnetic B field, induced current density, and power density.

The plasma model is for analyzing the plasma behavior and the inputs include, at least, electric field, magnetic B field, current density, chemistry, reaction cross section, reaction pathways, material properties (e.g., conductivity, permittivity, emission coefficient). RF frequency, RF voltage, and RF bias. The outputs include charged-species density and fluxes, ambipolar field, electron temperatures, electron energy distribution function (EEDF), ion energy-angle distribution (IEAD), on-wafer fluxes, charge density (surface and volume) source, and loss terms for species.

As discussed above, some outputs from one model may be used as input for other models. For example, the outputs from the chamber electromagnetics model may be used as inputs for the plasma behavior model (e.g., electric field, magnetic B field, current density).

The first model in FIG. 10 is for analyzing a performance of the sheath; the inputs include, at least, RF voltage, electric fields, source terms, reaction collision cross-sections, and reaction pathways. The outputs include the fluxes on the surface, ion energy and angular distribution, conduction and displacement currents, ion transit times, and charge density.

The next model is for the layout of the wafer feature and the inputs include, at least, design layout of the application, mask layers, and initial steps. The output includes a geometric description of the feature, such as CAD file or a mesh configuration.

The next model is for the chemistry of the feature and the inputs include, at least, on-wafer fluxes, material properties, reaction pathways, reaction rates, ion angular yields, etch thresholds, sticking coefficients, and accommodation coefficient. The outputs include geometry evolution and front tracking, distribution of species inside the feature, distribution of ion energies and angles inside the features.

The next model is for the dynamics at the atomistic level and the inputs include lattice structure, material ID, and interatomic potential. The outputs include the lattice layout, species distribution, radial distribution function, diffusion coefficients, and reaction kinetics.

The last model in the table is for the electronic states, which predicts the statics for energy calculation. The inputs include, at least, material/species ID, cluster configuration, and electronic structure information. The outputs include energy states, cluster configuration, reaction energetics, reaction pathways, bond angles, and bond lengths.

Figure 11:
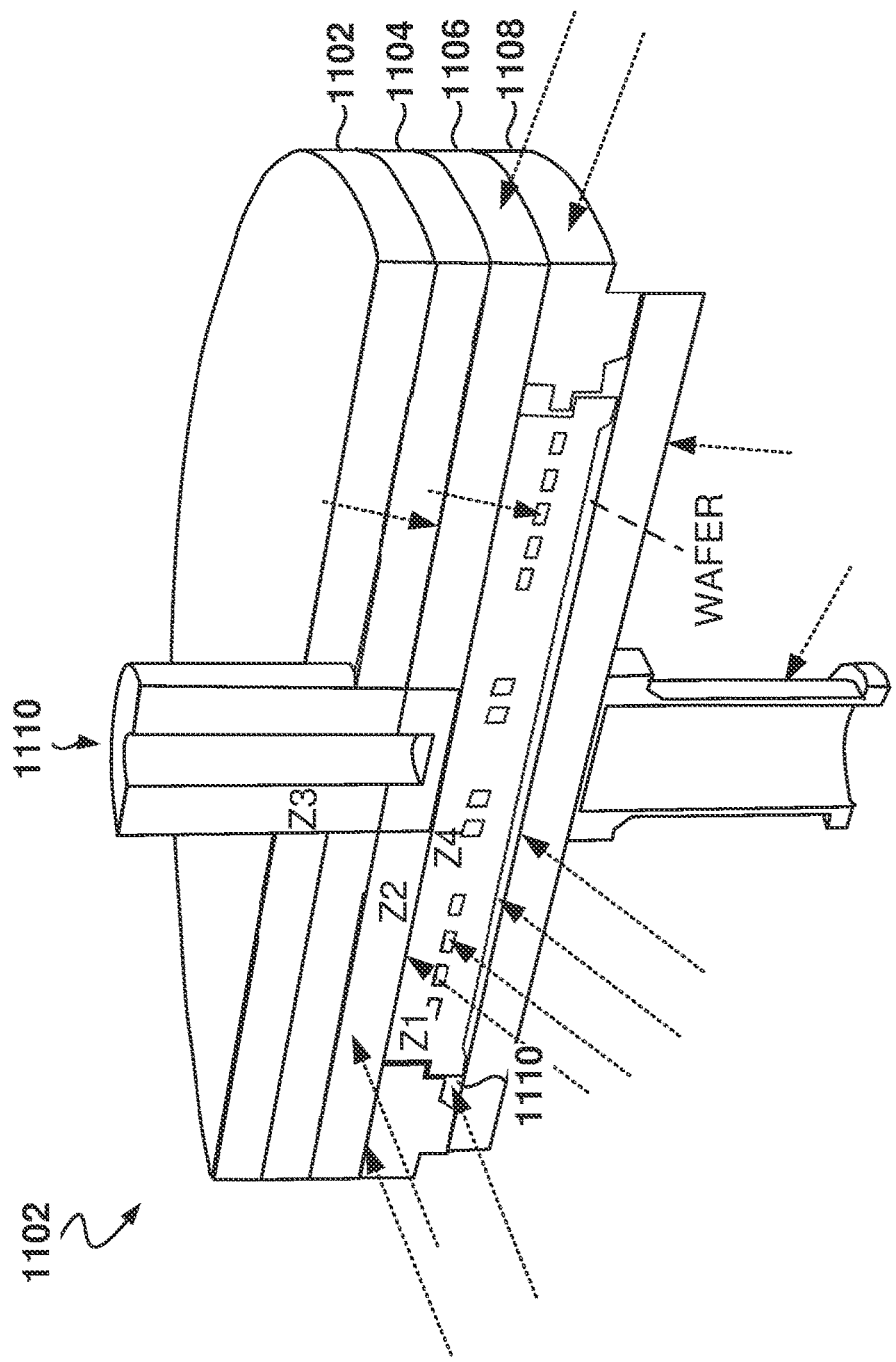
FIG. 11 illustrates the design of a showerhead using ML, according to some example embodiments.

FIG. 11 illustrates the design of a showerhead 1102 using ML, according to some example embodiments. For example, the showerhead 1102 is for use in a low-fluorine Tungsten reactor, but it could be used for other types of reactors.

In one example, the design of the showerhead was not meeting requirements regarding fill void, $WF_6$ gas consumption and Rs NU. Low gas consumption reduces Cost of Consumables (CoC) per wafer. Further, the pedestal-to-showerhead gap could not be set accurately by the auto-gapping system (AGS) at high temperatures such as 430° C. Further, the pedestal-to-showerhead planarity could not be set accurately using the AGS wafer as it does not measure at the outer edges of the pedestal. This leads to tool-to-tool variations and process impact. An improved design of the showerhead was required.

The showerhead 1102 presented thermal instability. The design team tried manually to change showerhead 1102 variables, but the process was slow and tedious, requiring large amounts of labor and long development times. A DOE was used to learn from simulations that require a long time for computations. The design process improved with the use of simulations, but it still took a long time, and the results of actual experiments did not actually match the results from simulations. This is why the ML model for the showerhead can speed up the design process. Also, since the ML model can be improved as additional data is available, the accuracy of the ML model improves over time and the design of the showerhead 1102 can be improved and accelerated.

The features for the showerhead ML are defined to cover multiple facets of the showerhead 1102 (arrows in figure illustrating some example areas), including one or more of the following:
  contact conductance between plates;
  contact conductance, gap conductance, and radiation between the manifold and the backplate;
  contact conductance, gap conductance, and radiation between the edge ring 1110 and the manifold;
  gap conductance and radiation between pedestal rings and showerhead edge;

contact conductance and gap conductance between showerhead backplate and manifold;

contact conductance, gap conductance, and radiation between pedestal range and pedestal;

radiation and gap conductance between wafer and showerhead and between wafer and pedestal;

gap conduction in the voids of the showerhead;

radiation to the ambient area for the outer surface of the pedestal and the pedestal rings;

gap conduction and radiation between surfaces of the showerhead and the edge ring;

radiation to the ambient area for the outer surface of the edge ring; and radiation to the ambient area for the outer surface of the manifold.

Further, zones are defined within the showerhead, such as illustrated zones Z1-Z4, and parameters associated with each zone are used as features, such as temperature on the zone or conductivity.

Multiple experiments are performed with variation in different parameters as inputs. The inputs may include number of holes in the showerhead, distribution of the holes, different types of gasses used, pressure of the gasses, delivery cycles, etc. The results, together with the inputs, are used as training data for the showerhead model. The results may include thickness of the wafer throughout its surface.

The showerhead model is then used to estimate respective outputs on the performance of the showerhead based on a variety of inputs. The outputs may include uniformity measured along the wafer, as well as metrology data obtained from the sensors in the chamber.

This way, the showerhead design team may quickly perform modeling of different showerhead configurations to determine which configuration would perform best for the given product requirements.

The resulting showerhead 1102 designed with the assistance of the showerhead model has a reduced showerhead internal cavity volume, reduced pedestal-to-showerhead volume, smaller gap between pedestal and showerhead, and a different face plate hole pattern. This results in reduced gas consumption while meeting, the required performance parameters, such as uniformity, temperature requirements, etc.

In some example embodiments, measurements of the showerhead gap and parochialism to the wafer were obtained using lasers that were mounted on the showerhead towards the atmospheric side. The laser light passed through a sapphire window vacuum sealed. Further, the laser light is reflected from the pedestal surface and the timing is used to measure the distance.

Figure 12:
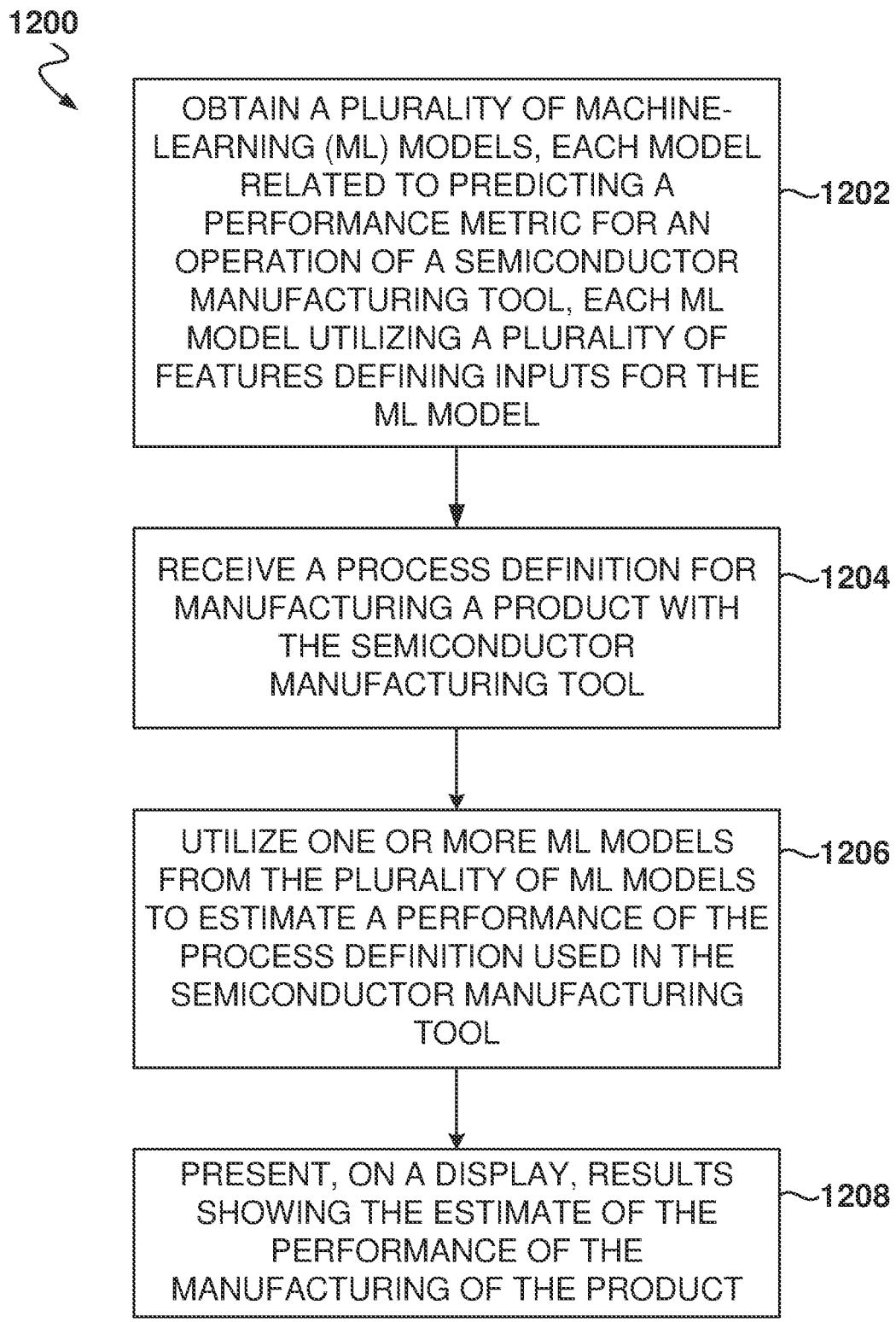
FIG. 12 is a flowchart of a method for predicting the performance of semiconductor manufacturing equipment operations, according to some example embodiments, for performing damage simulations.

FIG. 12 is a flowchart of a method 1200 for predicting the performance of semiconductor manufacturing equipment operations, according to some example embodiments. While the various operations in this flowchart are presented and described sequentially, one of ordinary skill will appreciate that some or all of the operations may be executed in a different order, be combined or omitted, or be executed in parallel.

At operation 1202, a plurality of machine-learning (ML) models are obtained, each model related to predicting a performance metric for an operation of a semiconductor manufacturing tool, and each ML model utilizing a plurality of features defining inputs for the ML model.

From operation 1202, the method 1200 moves to operation 1204 for receiving, by the one or more processors, a process definition for manufacturing a product with the semiconductor manufacturing tool.

Further, from operation 1204, the method 1200 moves to operation 1206 where the one or more processors utilize one or more from the plurality of ML models to estimate a performance of the process definition used in the semiconductor manufacturing tool.

From operation 1206, the method 1200 moves to operation 1208 where the results showing the estimate of the performance of the process are presented on a display.

In one example, creating one from the plurality of machine-learning (ML) models comprises obtaining training data fir the ML model, the training data providing values of the features for the ML model; and training an ML algorithm to obtain the ML model.

In one example, obtaining the training data for the ML model comprises performing experiments on the semiconductor manufacturing tool, measuring values of the features for the experiments, and using the measured values for the training data.

In one example, obtaining the training data for the ML model comprises obtaining the training data by performing physics-based simulations for the operation of the semiconductor manufacturing tool.

In one example, the plurality of ML models includes chamber, plasma, sheath, wafer features, atomistic, and electronic state models.

In one example, a chamber ML model is for estimating a geometry of a chamber in the semiconductor manufacturing tool with inputs including design dimensions and outputs include a definition of a geometry of the chamber.

In one example, a plasma ML model is for analyzing plasma behavior with inputs including one or more of electric field, magnetic B current density, chemistry, reaction cross section, reaction pathways, material properties. RF frequency, RF voltage, and RF bias, wherein outputs of the plasma ML model include one or more charged-species density and fluxes, ambipolar field, electron temperatures, electron energy distribution function (EEDF), ion energy-angle distribution (IEAD), on-wafer fluxes, charge density (surface and volume) source, and loss terms for species.

In one example, a sheath ML model is for analyzing a performance of a sheath with inputs including one or more of radiofrequency (RF) voltage, electric fields, source terms, reaction collision cross-sections, and reaction pathways, wherein outputs of the sheath ML model include one or more of fluxes on a wafer surface, ion energy and angular distribution, conduction and displacement currents, ion transit times, and charge density.

In one example, a wafer feature ML model if for analyzing a layout of a wafer feature with inputs including one or more of design layout, mask layers, and initial steps, wherein an output of the wafer feature ML model includes a geometric description of the wafer feature.

In one example, a wafer chemistry ML model is for analyzing a chemistry of a wafer feature with inputs including one or more of on-wafer fluxes, material properties, reaction pathways, reaction rates, ion angular yields, etch thresholds, sticking coefficients, and accommodation coefficient, wherein outputs of the wafer chemistry NIL model include one or more of geometry evolution and front tracking, distribution of species inside the Wafer feature, and distribution of ion energies and angles inside wafer features.

Figure 13:
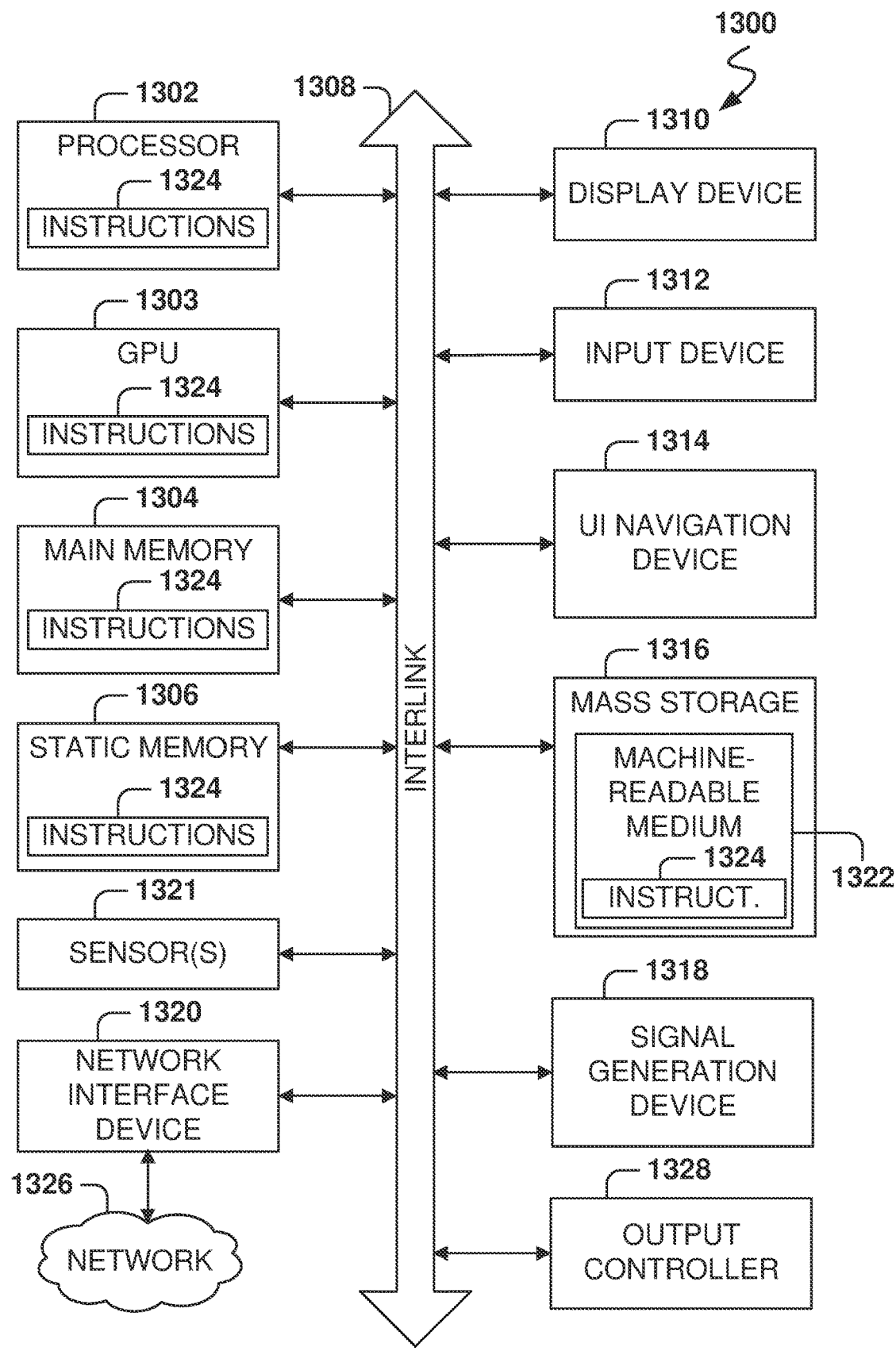
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and, underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium." may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments oldie present disclosure as represented by the appended claims. The specification and drawings are, accordingly, to be regarded in an illustrative rather than a restrictive sense.

What is claimed is:

1. A method comprising:
obtaining a plurality of machine-learning (ML) models, each of the plurality of ML models being related to predicting a performance metric for an operation of a semiconductor manufacturing tool, each ML model to utilize a plurality of features defining inputs for the ML model and include at least one semiconductor manufacturing process operation selected from operations including etch/atomic layer etch, electrofill, chemical vapor deposition (CVD), atomic layer deposition (ALD), clean and strip, physical vapor deposition, and chemical/mechanical polishing, the plurality of ML models being based on training data to make data-driven decisions expressed as outputs;
receiving, by one or more processors, a process definition for manufacturing a product with the semiconductor manufacturing tool;
utilizing, by the one or more processors, one or more ML models from the plurality of ML models to estimate a performance of the process definition used in the semiconductor manufacturing tool; and
presenting, on a display, results showing the estimate of the performance of the manufacturing of the product.

2. The method as recited in claim 1, wherein creating one ML model from the plurality of ML models comprises:
obtaining training data for the ML model, the training data providing values of the features for the ML model; and
training an ML algorithm to obtain the ML model.

3. The method as recited in claim 2, wherein obtaining the training data for the ML model comprises:
performing experiments on the semiconductor manufacturing tool;
measuring values of the features for the experiments; and
using the measured values for the training data.

4. The method as recited in claim 3, wherein obtaining the training data for the ML model further comprises:
training a secondary ML model to produce a reduced order model (ROM) for metrology data; and
utilizing an output of the secondary ML model as additional training data.

5. The method as recited in claim 2, wherein obtaining the training data for the ML model comprises:
obtaining the training data by performing physics-based simulations for the operation of the semiconductor manufacturing tool.

6. The method as recited in claim 1, wherein the plurality of ML models includes chamber, processing matrix, substrate-scale, wafer features, atomistic, and electronic state models.

7. The method as recited in claim 1, wherein a chamber ML model is for estimating a geometry of a chamber in the semiconductor manufacturing tool with inputs including design dimensions and outputs including a definition of the geometry of the chamber.

8. The method as recited in claim 1, wherein a processing matrix ML model is for analyzing behavior of an environment of a substrate during processing with inputs including one or more of electric field, magnetic B field, current density, chemistry, reaction cross section, reaction pathways, material properties, RF frequency, RF voltage, temperature and RF bias, wherein outputs of a plasma ML model include one or more of charged-species density and fluxes, ambipolar field, electron temperatures, electron energy distribution function (EEDF), ion energy-angle distribution (IEAD), on-wafer fluxes, charge density (surface and volume) source, and loss or generation terms for species.

9. The method as recited in claim 1, wherein a substrate-level ML model is for analyzing a performance of a sheath close to the substrate with inputs including one or more of radiofrequency (RF) voltage, electric fields, source terms, reaction collision cross-sections, solution concentrations and reaction pathways, wherein outputs of a sheath ML model include one or more of fluxes on a wafer surface, ion energy and angular distribution, conduction and displacement currents, ion transit times, surface functionalization, and charge density.

10. The method as recited in claim 1, wherein a wafer feature ML model is for analyzing a layout of a wafer feature with inputs including one or more of design layout, mask layers, and initial steps, wherein an output of the wafer feature ML model includes a geometric description of the wafer feature.

11. The method as recited in claim 1, wherein a wafer chemistry ML model is for analyzing a chemistry of a wafer feature with inputs including one or more of on-wafer fluxes, material properties, reaction pathways, reaction rates, ion angular yields, etch thresholds, sticking coefficients, and accommodation coefficient, wherein outputs of the wafer chemistry ML model include one or more of geometry evolution and front tracking, distribution of species inside the wafer feature, and distribution of ion energies and angles inside wafer features.

12. A system comprising:
a hardware-based memory comprising instructions; and
one or more computer processors, wherein the instructions, when executed by the one or more computer processors, cause the system to perform operations comprising:
obtaining a plurality of machine-learning (ML) models, each of the plurality of ML models being related to predicting a performance metric for an operation of a semiconductor manufacturing tool, each ML model to utilize a plurality of features defining inputs for the ML model and include at least one semiconductor manufacturing process operation selected from operations including etch/atomic layer etch, electrofill, chemical vapor deposition (CVD), atomic layer deposition (ALD), clean and strip, physical vapor deposition, and chemical/mechanical polishing, the plurality of ML models being based on training data to make data-driven decisions expressed as outputs;

receiving, by one or more processors, a process definition for manufacturing a product with the semiconductor manufacturing tool;

utilizing, by the one or more processors, one or more ML models from the plurality of ML models to estimate a performance of the process definition used in the semiconductor manufacturing tool; and presenting, on a display, results showing the estimate of the performance of the manufacturing of the product.

13. The system as recited in claim 12, wherein creating one ML model from the plurality of machine-learning (ML) models comprises:

obtaining training data for the ML model, the training data providing values of the features for the ML model; and training an ML algorithm to obtain the ML model.

14. The system as recited in claim 13, wherein obtaining the training data for the ML model comprises:

performing experiments on the semiconductor manufacturing tool;

measuring values of the features for the experiments;

using the measured values for the training data; and obtaining additional training data by performing physics-based simulations for the semiconductor manufacturing tool.

15. The system as recited in claim 12, wherein a chamber ML model is for estimating a geometry of a chamber in the semiconductor manufacturing tool with inputs including design dimensions and outputs including a definition of the geometry of the chamber.

16. The system as recited in claim 12, wherein a processing matrix ML model is for analyzing behavior of an environment of a substrate during processing with inputs including one or more of electric field, magnetic B field, current density, chemistry, reaction cross section, reaction pathways, material properties, temperature, mass transport, RF frequency, RF voltage, and RF bias, wherein outputs of the processing matrix ML model include one or more of charged-species density and fluxes, ambipolar field, electron temperatures, electron energy distribution function (EEDF), ion energy-angle distribution (IEAD), on-wafer fluxes, charge density (surface and volume) source, and loss or generation terms for species.

17. A machine-readable storage medium including instructions that, when executed by a machine, cause the machine to perform operations comprising:

obtaining a plurality of machine-learning (ML) models, each of the plurality of ML models being related to predicting a performance metric for an operation of a semiconductor manufacturing tool, each ML model to utilize a plurality of features defining inputs for the ML model and include at least one semiconductor manufacturing process operation selected from operations including etch/atomic layer etch, electrofill, chemical vapor deposition (CVD), atomic layer deposition (ALD), clean and strip, physical vapor deposition, and chemical/mechanical polishing, the plurality of ML models being based on training data to make data-driven decisions expressed as outputs;

receiving, by one or more processors, a process definition for manufacturing a product with the semiconductor manufacturing tool;

utilizing, by the one or more processors, one or more ML models from the plurality of ML models to estimate a performance of the process definition used in the semiconductor manufacturing tool; and presenting, on a display, results showing the estimate of the performance of the manufacturing of the product.

18. The machine-readable storage medium as recited in claim 17, wherein creating one ML model from the plurality of ML models comprises:

obtaining training data for the ML model, the training data providing values of the features for the ML model; and training an ML algorithm to obtain the ML model.

19. The machine-readable storage medium as recited in claim 18, wherein obtaining the training data for the ML model comprises:

performing experiments on the semiconductor manufacturing tool;

measuring values of the features for the experiments;

using the measured values for the training data; and obtaining additional training data by performing physics-based simulations for the semiconductor manufacturing tool.

20. The machine-readable storage medium as recited in claim 17, wherein a chamber ML model is for estimating a geometry of a chamber in the semiconductor manufacturing tool with inputs including design dimensions and outputs including a definition of the geometry of the chamber.

* * * * *